US011233474B2

(12) United States Patent
Takahashi et al.

(10) Patent No.: US 11,233,474 B2
(45) Date of Patent: Jan. 25, 2022

(54) ROTATING MACHINE DRIVE SYSTEM

(71) Applicant: Hitachi, Ltd., Tokyo (JP)

(72) Inventors: Akeshi Takahashi, Tokyo (JP); Yoshitaka Iwaji, Tokyo (JP); Shinji Sugimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/977,177

(22) PCT Filed: Dec. 11, 2018

(86) PCT No.: PCT/JP2018/045544
§ 371 (c)(1),
(2) Date: Sep. 1, 2020

(87) PCT Pub. No.: WO2019/167379
PCT Pub. Date: Sep. 6, 2019

(65) Prior Publication Data
US 2021/0044238 A1 Feb. 11, 2021

(30) Foreign Application Priority Data

Mar. 2, 2018 (JP) .............................. JP2018-038105

(51) Int. Cl.
*H02P 27/06* (2006.01)
*H02P 25/18* (2006.01)
(52) U.S. Cl.
CPC .............. *H02P 25/18* (2013.01); *H02P 27/06* (2013.01)
(58) Field of Classification Search
CPC ........ H02P 25/18; H02P 25/184; H02P 27/06; H02P 23/009; H02P 6/182
See application file for complete search history.

(56) References Cited

U.S. PATENT DOCUMENTS 5,070,291 A * 12/1991 Nakamura .............. H02P 25/18
318/77
5,760,567 A 6/1998 Nakamura et al.
(Continued)

FOREIGN PATENT DOCUMENTS

JP 5-3694 A 1/1993
JP 7-298682 A 11/1995
(Continued)

OTHER PUBLICATIONS

International Search Report (PCT/ISA/210) issued in PCT Application No. PCT/JP2018/045544 dated Mar. 19, 2019 with English translation (four (4) pages).
(Continued)

*Primary Examiner* — Thai T Dinh
(74) *Attorney, Agent, or Firm* — Crowell & Moring LLP

(57) ABSTRACT

A rotating machine drive system includes: a rotating machine that includes a plurality of windings; a phase current detecting circuit that detects a phase current to be supplied to the rotating machine; an inverter device that includes an inverter circuit that converts DC power from a DC power supply into AC power, and a control device that controls power conversion being performed by an inverter main circuit on the basis of the phase current detected by the phase current detecting circuit, the inverter device operating the rotating machine at a variable speed; and a winding switching device that switches connections of the plurality of windings in accordance with a command from the control device. In a case where the rotation zone of the rotating machine is to be changed, the control device stops the current supply from the inverter circuit to the rotating machine, and switches the rotation zone of the rotating machine from a low-speed rotation zone to a high-speed rotation zone, or from the high-speed rotation zone to the low-speed rotation zone, on condition that a line internal (Continued)

voltage induced by a field magnetic flux of the rotating machine is lower than the DC voltage of the DC power supply.

11 Claims, 8 Drawing Sheets

(56) References Cited

U.S. PATENT DOCUMENTS

| | | | | |
|---|---|---|---|---|
| 9,722,513 B2* | 8/2017 | Bock | ............... | H01H 9/563 |
| 2005/0013085 A1* | 1/2005 | Kinsella | ............ | H01H 9/563 |
| | | | | 361/162 |
| 2008/0116839 A1* | 5/2008 | Hoemann | ........... | H02P 25/18 |
| | | | | 318/772 |
| 2013/0082626 A1* | 4/2013 | Daigle | ............ | B60L 3/102 |
| | | | | 318/52 |
| 2014/0132198 A1* | 5/2014 | Zahora | ............ | H02P 25/184 |
| | | | | 318/771 |
| 2014/0217946 A1* | 8/2014 | Kume | ............ | H02P 6/08 |
| | | | | 318/497 |
| 2014/0239876 A1* | 8/2014 | Hao | ............ | H02P 25/188 |
| | | | | 318/724 |
| 2017/0229993 A1* | 8/2017 | Obry | ............ | H02P 25/188 |

FOREIGN PATENT DOCUMENTS

| | | | |
|---|---|---|---|
| JP | 2002-291288 A | | 10/2002 |
| JP | 2008-22665 A | | 1/2008 |
| JP | 2008-211933 A | | 9/2008 |
| JP | 2010-200439 A | | 9/2010 |
| JP | 2010200439 A | * | 9/2010 |
| JP | 2014-165957 A | | 9/2014 |

OTHER PUBLICATIONS

Japanese-language Written Opinion (PCT/ISA/237) issued in PCT Application No. PCT/JP2018/045544 dated Mar. 19, 2019 (five (5) pages).

* cited by examiner

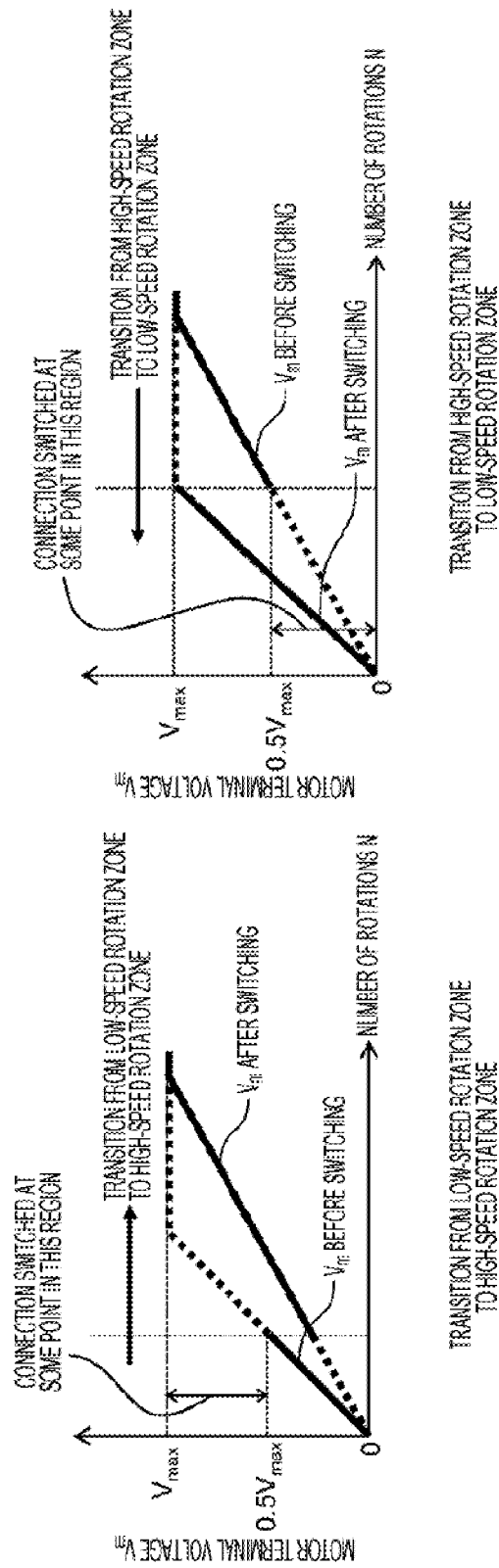

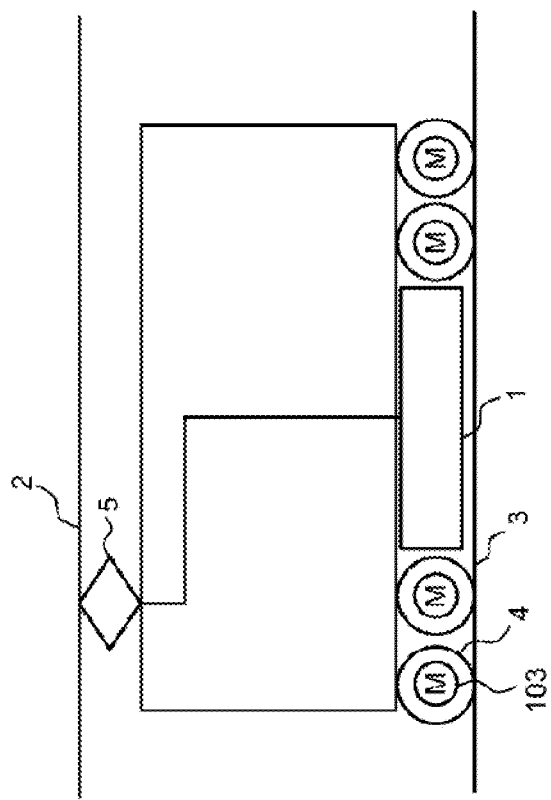

ROTATING MACHINE DRIVE SYSTEM

TECHNICAL FIELD

The present invention relates to a rotating machine drive system that drives a rotating machine.

BACKGROUND ART

The efficiency of a rotating machine that is driven at variable speed by an inverter device is normally represented by an efficiency curve obtained by changing the rotation speed under a constant load condition, and the efficiency reaches a peak in one of rotation zones of the required rotation range. To realize device energy saving, it is important to improve the efficiency curve over a wide rotation range, and reduce power loss of the rotating machine.

However, it is known that the efficiency of a conventional rotating machine drops in a low-speed rotation zone. One of the factors of this is that a conventional rotating machine is designed to have a small inductance so as to expand the rotation range. In a conventional rotating machine having a small inductance, a harmonic component corresponding to the switching frequency of the inverter device is superimposed on a substantially sinusoidal current waveform supplied to the rotating machine. Because of this, the harmonic component of iron loss generated in the core of the rotating machine, AC copper loss generated by the skin effect and the proximity effect of the stator winding, and the like become larger, which leads to a decrease in the efficiency of the rotating machine.

Meanwhile, it is known that an increase in the inductance of the rotating machine at the stage of designing can reduce the current value and also reduce the harmonic component. As a result, the efficiency in the low-speed rotation zone can be improved. However, there are problems that the efficiency in the high-speed rotation zone becomes lower, and the rotor cannot be driven in the high-speed rotation zone and loses synchronism.

To solve such a problem, there is a technique for switching the connection of the stator winding between a low-speed rotation zone and a high-speed rotation zone, as disclosed in PTL 1. In a case where connections are switched while the rotating machine is being driven, arcs are generated at the switching contact points, and the life of the contact points is shortened. PTL 1 discloses a technique for switching connections after reducing torque commands and putting the inverter main circuit into a non-energized state so as to avoid contact arcs.

CITATION LIST

Patent Literature

PTL 1: JP 5-3694 A

SUMMARY OF INVENTION

Technical Problem

The cause of generation of a contact arc is that, at the moment when the distance between contact points decreases to a very short distance during a contact opening/closing operation, the electric field strength of the portion increases, resulting in dielectric breakdown and an excessive flow of current. For this reason, even if the contact portions are in a non-energized state, generation of contact arcs cannot be avoided in a configuration in which a potential difference is generated between contact points, and a circuit that can be energized in a contact closed state is formed. In such a configuration it is difficult to prolong the life of the contact points.

This problem is also caused in a case where winding connections are switched during a transition between the low-speed rotation zone and the high-speed rotation zone. Even if winding connections are switched while the inverter main circuit is in a non-energized state, a potential difference is invariably generated between the line internal voltage Vac induced by the field magnetic flux of the rotating machine and the DC voltage Vdc supplied to the inverter device. Because of this, a potential difference is also generated between the contact points, and a circuit that can be energized in a contact closed state is formed. Therefore, there are problems that contact arcs are repeatedly generated every time winding connections are switched in accordance with acceleration/deceleration of the rotating machine, and the shortening of the life of the contact points leads to an increase in maintenance costs. Furthermore, as the risk of defects such as melting of the contact points becomes higher, the reliability of the drive system becomes lower.

Note that a method by which switching contact points are formed with semiconductor switching elements has been disclosed as a means to solve the above problems. By this method, however, the switching elements are always energized while the rotating machine is driven. Therefore, conduction loss is caused. That is, because new power loss is to be caused at the switching contact points, it cannot be said that the above method is effective in improving the energy efficiency of the entire drive system.

An object of the present invention is to change the rotation zone of a rotating machine without generation of contact arcs.

Solution to Problem

To achieve the above object, the present invention provides a rotating machine drive system that includes: a rotating machine that includes a plurality of windings; a phase current detecting circuit that detects a phase current to be supplied to the rotating machine; an inverter device that includes an inverter circuit that converts DC power from a DC power supply into AC power, and a control device that controls power conversion being performed by the inverter circuit on the basis of the phase current detected by the phase current detecting circuit, the inverter device operating the rotating machine at a variable speed; and a winding switching device that switches connections of the plurality of windings in accordance with a command from the control device. In a case where the rotation zone of the rotating machine is to be changed, the control device stops the current supply from the inverter circuit to the rotating machine, and switches the rotation zone of the rotating machine from a low-speed rotation zone to a high-speed rotation zone, or from the high-speed rotation zone to the low-speed rotation zone, on condition that a line internal voltage induced by a field magnetic flux of the rotating machine is lower than the DC voltage of the DC power supply.

Advantageous Effects of Invention

According to the present invention, the rotation zone of a rotating machine can be changed without contact arc generation. As a result, in a rotating machine that is operated at a variable speed by an inverter device, efficiency can be increased in a rotation range including both a low-speed rotation zone and a high-speed rotation zone.

The objects, structures, and effects other than the above will become more apparent from the embodiments described below.

BRIEF DESCRIPTION OF DRAWINGS

FIGS. 7A and 7B are graphs for explaining connection switching timings in a second embodiment of the present invention.

FIG. 8 is a configuration diagram of a rotating machine drive system that is used in a railroad vehicle according to a third embodiment of the present invention.

DESCRIPTION OF EMBODIMENTS

The following is a description of embodiments of the present invention, with reference to the drawings. In the description below, like components are denoted by like symbols. The names and functions of like components are the same, and explanation of them will not be unnecessarily repeated. Further, in the description below, connection switching between 1Y connection and 2Y connection will be mainly described. However, the effects of the present invention are not limited to this. The present invention can also be applied to a configuration in which the number of parallel Y-connections is switched, a configuration in which the number of parallel A-connections is switched, or a configuration in which a Y-connection and a A-connection are switched. Meanwhile, the rotating machine may be an induction machine, a permanent magnet synchronous machine, a wounding synchronous machine, or a synchronous reluctance rotating machine. Also, the winding method for the stator may be concentrated winding or distributed winding. Further, the number of phases of stator windings is not limited to that in the configurations of the embodiments. Although the semiconductor switching elements of the inverter device are insulated gate bipolar transistors (IGBTs), the effects of the present invention are not limited to this. The semiconductor switching elements may be metal oxide semiconductor field effect transistors (MOSFETs), or may be some other power semiconductor elements. Further, the control method for the rotating machine is vector control not using a speed detector and a voltage detector. However, the present invention can also be applied to a control method using a speed detector and a voltage detector.

First Embodiment

Figure 1:
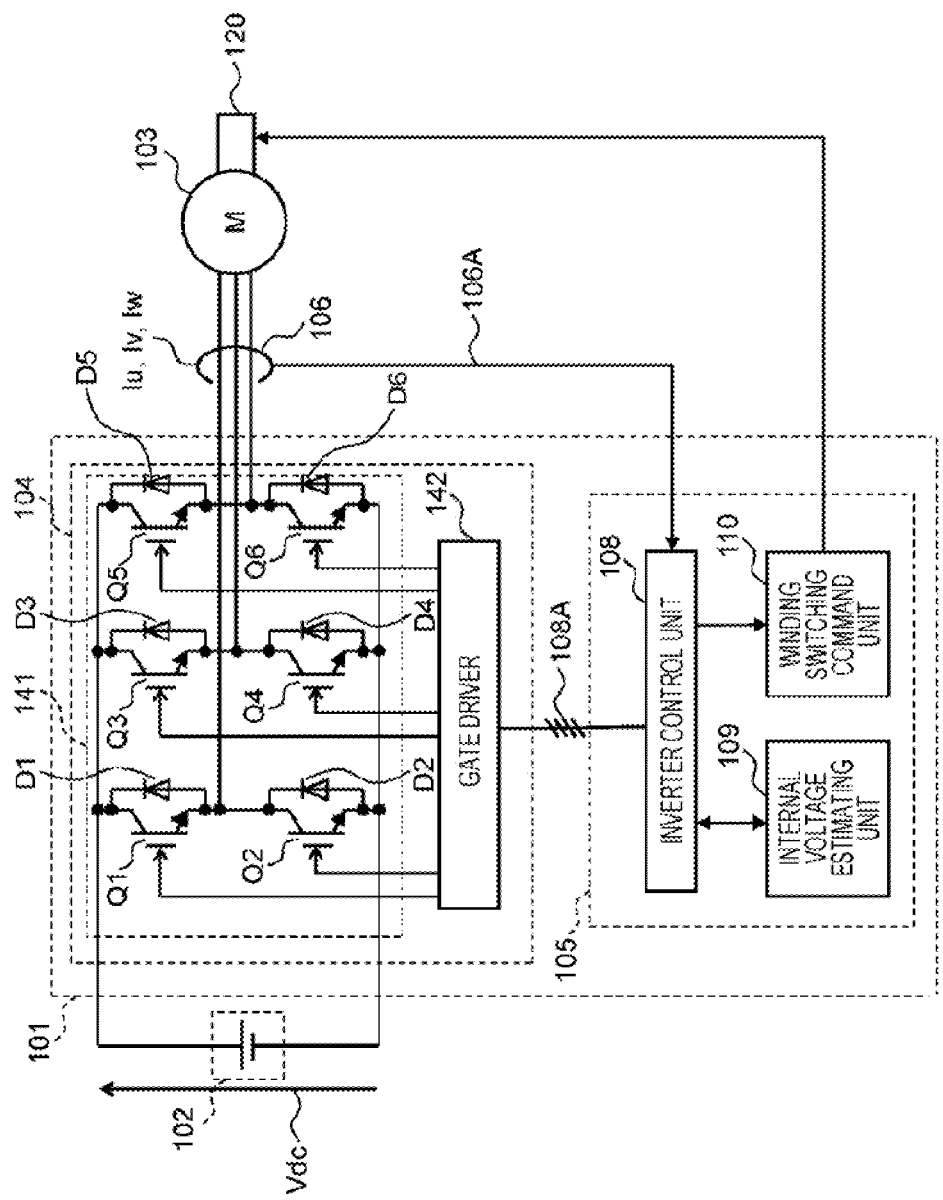
FIG. 1 is a block diagram illustrating the entire configuration of a rotating machine drive system according to a first embodiment of the present invention.
Figure 4:
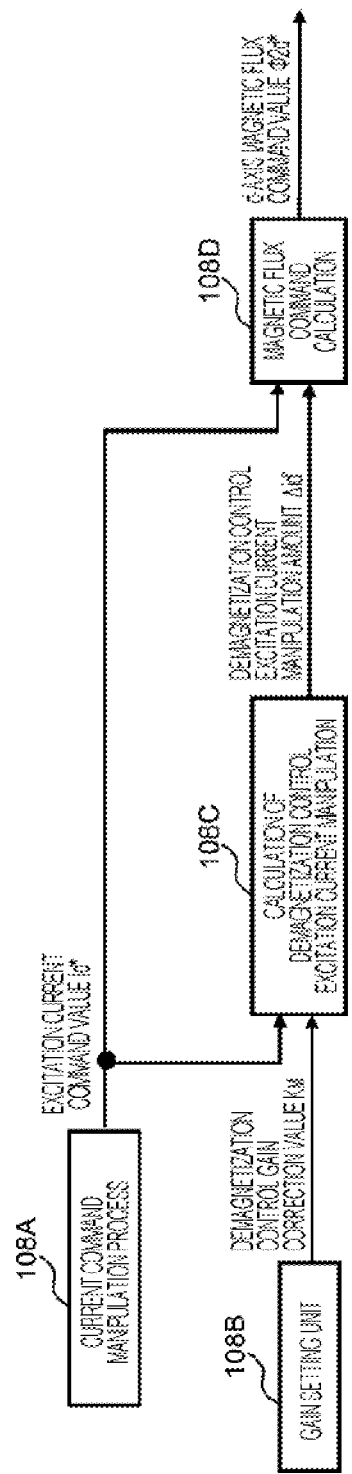
FIG. 4 is a block diagram illustrating a configuration of demagnetization control according to the first embodiment of the present invention.
Figure 5:
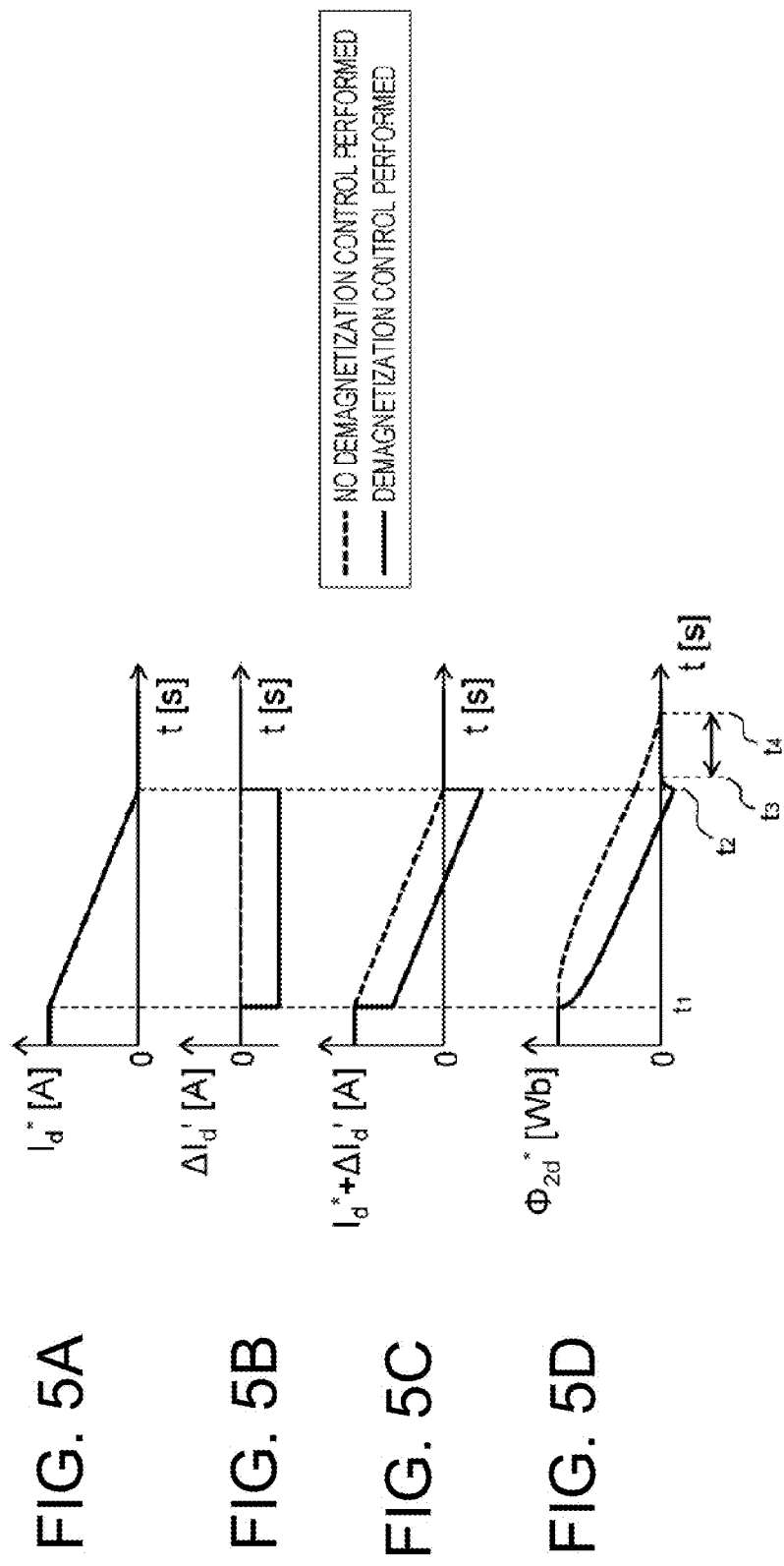
FIGS. 5A to 5D are charts for explaining the effects of demagnetization control according to the first embodiment of the present invention.
Figure 6:
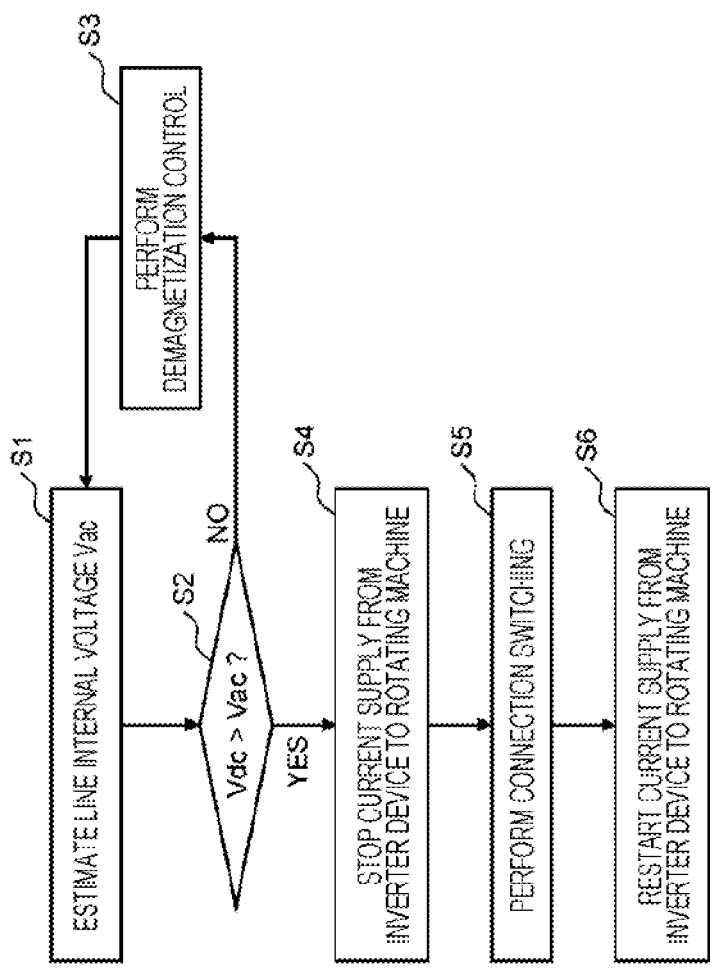
FIG. 6 is a flowchart showing a connection switching sequence according to the first embodiment of the present invention.

In the description below, a first embodiment of the present invention is explained, with reference to FIGS. 1 through 6. FIG. 1 is a block diagram illustrating the entire configuration of a rotating machine drive system according to the first embodiment of the present invention. FIG. 2 is a diagram for explaining a winding switching device according to the first embodiment of the present invention. FIG. 3 is a circuit diagram illustrating a time of connection switching according to the first embodiment of the present invention, and a waveform chart of the internal voltage of a rotating machine. FIG. 4 is a block diagram illustrating a configuration of demagnetization control according to the first embodiment of the present invention. FIG. 5 is charts for explaining the effects of demagnetization control according to the first embodiment of the present invention. FIG. 6 is a flowchart showing a connection switching sequence according to the first embodiment of the present invention.

Referring now to FIG. 1, the overall configuration of the rotating machine drive system of this embodiment is described. In FIG. 1, an inverter device 101 includes: an inverter circuit 104 that converts DC power as an output of a DC power supply 102 into AC power, and outputs the AC power to a rotating machine 103; a phase current detecting circuit 106 that detects a current flowing in the rotating machine 103 connected to the inverter circuit 104; and a control device 105 that operates the rotating machine 103 at a variable speed by performing inverter control (power conversion control) on the inverter circuit 104, using an applied voltage command pulse signal 108A based on phase current information 106A detected by the phase current detecting circuit 106. The phase current detecting circuit 106 is formed with a Hall current transformer (CT) or the like, and detects three-phase current waveforms Iu, Iv, and Iw of U-, V-, and W-phases. However, it is not always necessary to detect all the three phases of current with the phase current detecting circuit 106. Instead, any two phases may be detected, and the other one phase may be obtained by calculation on the assumption that the three-phase current is in a balanced state. The inverter circuit 104 includes: an inverter main circuit 141 including a plurality of semiconductor switching elements such as IGBTs Q1 through Q6 and diodes (return diodes) D1 through D6; and a gate driver 142 that generates gate signals for the IGBTs Q1 through Q6 of the inverter main circuit 141, on the basis of the applied voltage command pulse signal 108A from an inverter control unit 108.

The rotating machine 103 is formed with an induction machine having a plurality of windings, for example. The starts and the ends of some of the windings are drawn out so that connections of the respective windings can be switched, and are stored in a winding switching device 120. The winding switching device 120 has a circuit configuration that can switch connections of the windings of the rotating machine 103, and switches winding connections on the basis of a signal from a winding switching command unit 110.

The control device 105 includes: the inverter control unit 108 that calculates applied voltage command pulse information 108A, using the phase current information 106A detected by the phase current detecting unit 106; and an internal voltage estimating unit 109 that estimates a line internal voltage Vac to be induced by a field magnetic flux of the rotating machine 103; and the winding switching command unit 110 that supplies a connection switching signal to the winding switching device 120.

The inverter control unit 108 has an algorithm for estimating a rotary frequency on the basis of an AC voltage command value applied to the rotating machine 103 and a detected current value (a current value detected by the phase current detecting unit 106), and estimates a rotary frequency. However, this method is effective only in cases where current is supplied from the inverter circuit 104 of the inverter device 101 to the rotating machine 103. To cope with cases where winding connection switching is performed while the current supply is suspended, and the current supply is then restarted, the inverter control unit 108 also has an initial speed estimation algorithm for estimating the rotary frequency of the rotating machine 103 instantly after a start of energization. Further, the axis of the field magnetic flux of the rotating machine 103 is defined as the d-axis, the axis for adjusting a torque current orthogonal to the d-axis is defined as the q-axis, and AC variable physical amounts such as voltage, current, and magnetic flux are regarded as DC amounts in a dq-axial coordinate system.

Using the rotary frequency calculated by the inverter control unit 108 on the basis of the phase current information 106A and field magnetic flux information, the internal voltage estimating unit 109 estimates the line internal voltage Vac to be induced by the field magnetic flux of the rotating machine 103, and outputs the estimation result to the inverter control unit 108.

Referring now to FIGS. 2 and 3, the configuration of a switching device and the principles for achieving the objective of the present invention using the switching device are explained. Also, the problem of contact arc generation at a time of connection switching, the means to solve the problem, and the principles of the solution are described.

Figure 2A:
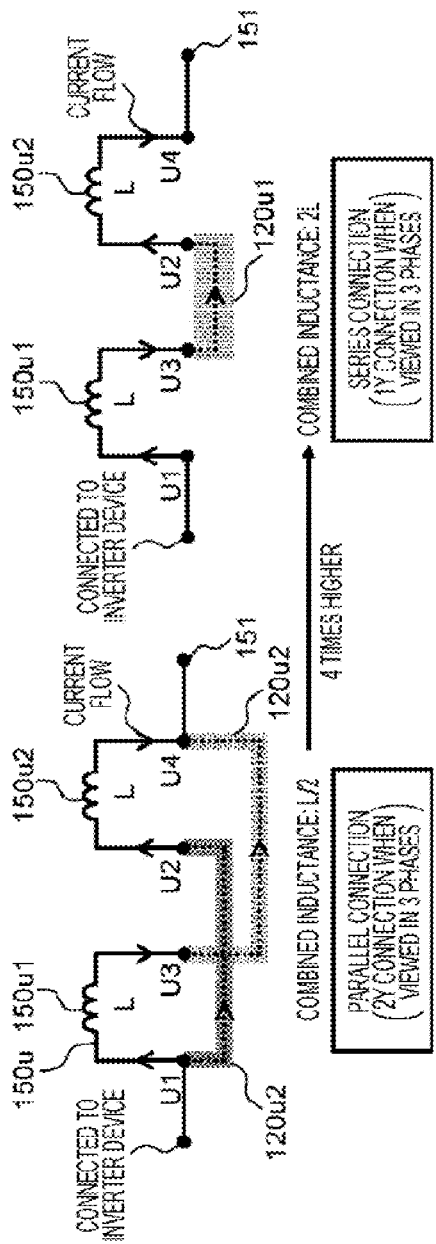
FIGS. 2A and 2B are diagrams for explaining a winding switching device according to the first embodiment of the present invention.

FIG. 2(a) is a diagram schematically illustrating a configuration that pulls out the starts (terminals) U1 and U2 and the ends (terminals) U3 and U4 of two windings 150u1 and 150u2 of a stator U-phase winding 150u of the rotating machine 103, and switches between series connection and parallel connection. The same applies to the V-phase and the W-phase, and therefore, explanation of them is not made herein. The start U1 and the start U2, and the end U3 and the end U4 of the U-phase winding 150u in FIG. 2(a) are connected in parallel by a switching device 120u2, parallel connection is performed for the V-phase and the W-phase in the same manner, and the neutral points 151 of the three phases is connected in a Y-shape. This configuration is called 2Y connection. On the other hand, the end U3 of the U-phase winding 150u1 and the start U2 of the U-phase winding 150u2 in FIG. 2(a) are connected in series by a switching device 120u1, series connection is performed for the V-phase and the W-phase in the same manner, and the neutral points 151 of the three phases are connected in a Y-shape. This configuration is called 1Y connection. As shown in FIG. 2(a), the inductance in the series connection (1Y connection when viewed in the three phases) is four times larger than that in the parallel connection (2Y connection when viewed in the three phases). Accordingly, the series connection greatly reduces the harmonic component of the current to be supplied from the inverter device 101 to the rotating machine 103.

Figure 2B:
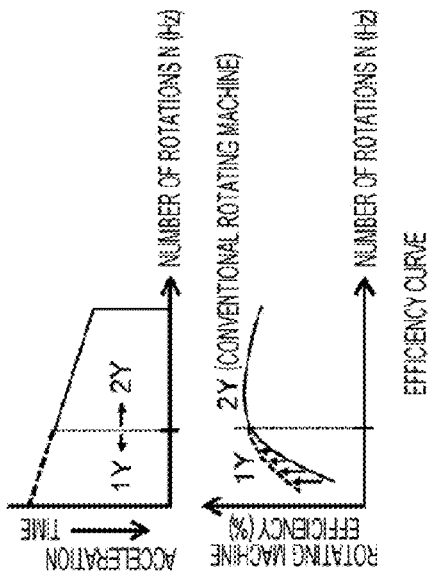

Since a conventional rotating machine is designed to have a smaller inductance so as to extend the rotation range, the harmonic component of the current increase, and efficiency drops particularly in the low-speed rotation zone as shown in FIG. 2(b). With the use of the switching device 120, on the other hand, series connection (1Y connection when viewed in the three phases) is formed in the low-speed rotation zone, and parallel connection (2Y connection when viewed in the three phases) is formed in the high-speed rotation zone. Thus, while driving in the required wide rotation range (a rotation range extending from the low-speed rotation zone to the high-speed rotation zone) is enabled, the efficiency curve can be improved in a wide rotation range, and power loss of the rotating machine 103 can be reduced. Further, in the low-speed rotation zone, the inductance in the rotating machine 103 is increased by the series connection. Thus, the value of the current to be supplied from the inverter device 101 to the rotating machine 103 can be reduced, and power loss of the inverter device 101 can be greatly reduced. In the conventional technology, however, there is the problem that an arc is generated at a switching contact point, and the contact life is shortened in a case where connections are switched during driving of a rotating machine.

Figure 3A:
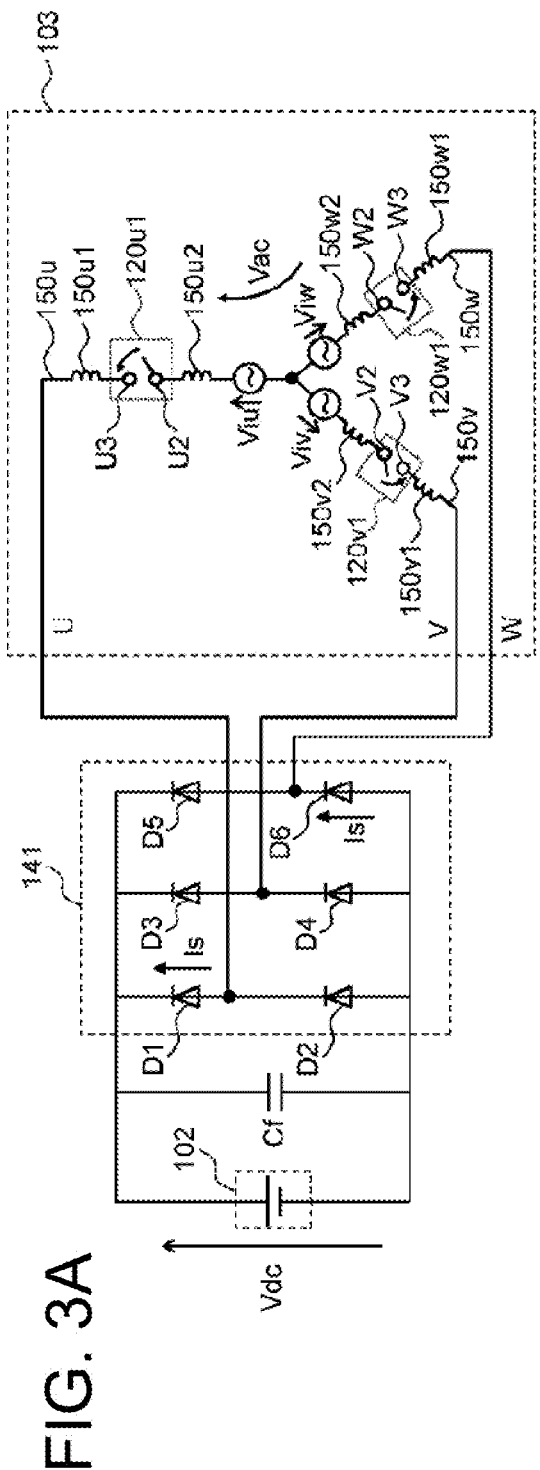
FIGS. 3A and 3B are circuit diagrams illustrating a time of connection switching according to the first embodiment of the present invention, and a waveform chart of the internal voltage of a rotating machine.

FIG. 3 is a diagram schematically illustrating the principle that an arc is generated at a switching contact point even in a case where the current supply from the inverter main circuit 141 to the rotating machine 103 is stopped at a time of connection switching, to create a non-energized state. FIG. 3(a) shows an example state in which the stator U-phase winding 150u, a V-phase winding 150v, and a W-phase winding 150w of the rotating machine 103 are switched from parallel connection to series connection as shown in FIG. 2. The winding switching devices 120u1, 120v1, and 120w1 of the respective phases are switched from a contact open state to a contact closed state, and the end U3 and the start U2, the end V3 and the start V2, and the end W3 and the start W2 are connected, so that two windings 150u1 and 150u2, 150v1 and 150v2, and 150w1 and 150w2 of the respective phases are connected in series. The inverter main circuit 141 receives a power supply from the DC power supply 102. However, at a time of connection switching, the control device 105 performs control to turn off the gates of the IGBTs (Q1 through Q6), to stop the current supply to the rotating machine 103.

Therefore, in FIG. 3(a), the IGBTs are not regarded as circuit components, and only the return diodes D1 through D6 of the IGBTs are regarded as circuit components. In a case where MOSFETs are used as the semiconductor switching elements, the parasitic diodes (body diodes) of the MOSFETs, and Schottky barrier diodes (SBDs) connected in parallel to the MOSFETs can be regarded as circuit components like the return diodes described above. Note that a filter reactor, a filter capacitor, a protection circuit for the DC power supply 102, and the like are connected between the inverter main circuit 141 and the DC power supply 102, but only a filter capacitor Cf is shown in this drawing, for ease of explanation.

Figure 3B:
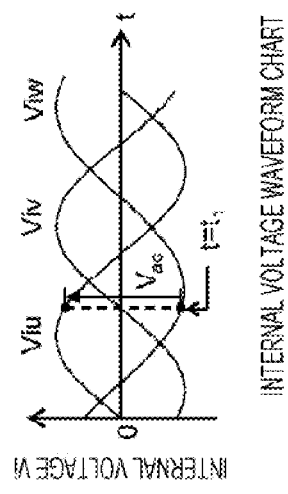

In the rotating machine 103, internal voltages Viu, Viv, and Viw induced by a field magnetic flux $\Phi 2d$ are generated in the U-, V-, and W-phases, respectively. The internal voltages Viu, Viv, and Viw depend on the rotary frequency fr, and vary in an alternating manner as shown in FIG. 3(b). In the description below, a case where the line internal voltage Vac is generated between the U-phase and the W-phase will be described, with the moment of t=t1 in FIG. 3(b) being taken as an example. Note that, strictly speaking, the internal voltage Vi is generated in each of the windings 150u1 and 150u2, 150v1 and 150v2, and 150w1 and 150w2 of the respective phases. However, FIG. 3(a) shows one AC voltage element for each phase, for ease of explanation.

That is, if the magnitude of the line internal voltage Vac in FIG. 3(b) is the magnitude at the time of parallel connection, the line internal voltage at the time of series connection is 2Vac. In this embodiment, however, attention is paid only to the relative magnitude relationship between a DC voltage Vdc (the voltage at both ends of the DC power supply 102) and the line internal voltage Vac, regardless of the connection state of the windings, as will be described later. In this manner, the means to solve the problem of contact arcs has been found, and whether the reference value of the line internal voltage is that at a time of parallel connection or that at a time of serial connection is not important. In view of this, on the assumption that the magnitude of the line internal voltage Vac differs before and after connection switching, the line internal voltage is represented by Vac in either case.

In FIG. 3(a), in a case where the line internal voltage Vac is higher than the DC voltage Vdc, a potential difference is generated between the start U2 and the end U3, and between the start W2 and the end W3, and the contact points are switched to a closed state, so that the current flows from the rotating machine 103 (the high-potential side) to the inverter main circuit 141 (the low-potential side). As the direction of this current matches the forward direction of the return diodes D1 through D6, a surge current Is is generated, which causes contact arcs. In the conventional technology, it has been considered that putting the inverter main circuit into a non-energized state and switching connections could prevent contact arcs. However, in a case where the line internal voltage Vac becomes higher than the DC voltage Vdc either before or after connection switching, contact arcs are generated. In such a state, contact arcs are repeatedly generated every time winding connections are switched in accordance with acceleration/deceleration of the rotating machine, and the shortening of the life of the contact points leads to an increase in maintenance costs. Furthermore, as the risk of defects such as melting of the contact points becomes higher, the reliability of the rotating machine drive system becomes lower.

To solve the problems described above, this embodiment focuses on the relative magnitude relationship between the DC voltage Vdc and the line internal voltage Vac. That is, it is considered that making the line internal voltage Vac lower than the DC voltage Vdc both before and after connection switching can prevent contact arcs. Referring again to FIG. 3(a), the principles are described below. In a case where the line internal voltage Vac is lower than the DC voltage Vdc, a potential difference is generated between the start U2 and the end U3, and between the start W2 and the end W3. However, when the contact points are switched to a closed state, the current starts flowing from the inverter main circuit 141 (the high-potential side) to the rotating machine 103 (the low-potential side). However, the direction of this current is the reverse of that of the return diodes D1 through D6. Therefore, energization is blocked, and the non-energized state is maintained. Because of this, no contact arcs are generated. At this point of time, to change the rotation zone of the rotating machine 103, the control device 105 stops the current supply from the inverter circuit 104 to the rotating machine 103, and compares the line internal voltage Vac induced by the field magnetic flux of the rotating machine 103 with the DC voltage Vdc as an output of the DC power supply 102. If the line internal voltage Vac is lower than the DC voltage Vdc, the control device 105 switches the rotation zone of the rotating machine 103 from the low-speed rotation zone to the high-speed rotation zone, or from the high-speed rotation zone to the low-speed rotation zone.

Table 1 collectively shows below the combinations of magnitude relationships between the DC voltage Vdc and the line internal voltage Vac before and after connection switching, the presence/absence of contact arcs, and possible transition states between the low-speed rotation zone and the high-speed rotation zone in the respective combinations.

TABLE 1

| # | Before connection switching | After connection switching | Contact arc | Principal possible transition states low speed → high speed | high speed → low speed |
|---|---|---|---|---|---|
| 1 | Vdc < Vac | Vdc < Vac | x generated | ○ | ○ |
| 2 | Vdc < Vac | Vdc < Vac | x generated | ○ | — |
| 3 | Vdc < Vac | Vdc < Vac | x generated | — | ○ |
| 4 | Vdc < Vac | Vdc < Vac | not generated | ○ | ○ |

Regarding the transition states in Table 1, #2 is an assumed case of a transition from low speed to high speed, since the internal voltage increases when series connection (1Y connection) is formed in the low-speed rotation zone as shown in FIG. 2(b). Likewise, #3 is an assumed case of a transition from high speed to low speed.

The line internal voltage Vac depends on the rotary frequency fr of the rotating machine 103, and its magnitude is proportional to the field magnetic flux Φ2d and the rotary frequency fr, as shown in Expression (1) shown below.

[Mathematical Formula 1]

$$Vac \propto \Phi 2d \cdot fr \tag{1}$$

In this embodiment, the internal voltage estimating unit 109 estimates the line internal voltage Vac, and the winding switching command unit 110 issues a command for winding connection switching, at such a rotary frequency fr that the line internal voltage Vac becomes lower than the DC voltage Vdc both before and after connection switching. This makes it possible to switch connections always in the state denoted by #4 in Table 1, and thus, contact arcs can be avoided.

Note that the line internal voltage Vac before and after connection switching can be grasped at the stage of designing. Therefore, the winding switching command unit 110 is designed beforehand to issue a command for connection switching at such a rotary frequency fr that the line internal voltage Vac becomes lower than the DC voltage Vdc both before and after connection switching. Thus, contact arcs can be avoided, without the internal voltage estimating unit 109.

The problem that contact arcs are generated at a time of connection switching, the means to solve the problem, and the principles of the solution have been described above.

However, in the cases of #1 through #3 in Table 1, contact arcs cannot be avoided by the conventional technology. In this embodiment, on the other hand, to solve this problem, a method of performing demagnetization control so that the line internal voltage Vac becomes lower than the DC voltage Vdc both before and after connection switching has been found. This will be described below, with reference to FIGS. 4 and 5.

FIG. 4 is a diagram illustrating a process configuration of demagnetization control. FIG. 5 is waveform charts schematically showing how each operation amount of the inverter control unit 108 and the field magnetic flux Φ2d change with demagnetization control. In an example, while the induction machine (the rotating machine 103) is in a driven state, even if the current supply from the inverter main circuit 141 to the rotating machine 103 is stopped, the field magnetic flux Φ2d does not immediately become zero, but attenuates at a time constant determined by the secondary resistance and the secondary leakage inductance of the rotor. Therefore, it takes time for the magnetic flux to disappear. In this state, it takes an enormous amount of time to switch connections, and therefore, the specifications required for the rotating machine drive system cannot be satisfied.

To counter the problem in this embodiment, in a case where the line internal voltage Vac is determined to be higher than the DC voltage Vdc either before or after connection switching on the basis of a result of calculation performed by the internal voltage estimating unit 109 before the inverter main circuit 141 stops the current supply to the rotating machine 103, demagnetization control is performed so that the field magnetic flux is reduced, and the line internal voltage Vac becomes lower than the DC voltage Vdc both before and after connection switching.

Specifically, as shown in FIG. 4, the inverter control unit 108 in a current command manipulation process 108A stores the past values of an excitation current command value Id*, and calculates a change ΔId in the excitation current command value Id* with respect to time. The inverter control unit 108 then performs a demagnetization control excitation current manipulation amount calculation 108C, from a demagnetization control gain correction value KM set in a gain setting unit 108B and the change ΔId in the excitation current command value Id* with respect to time. In doing so, the inverter control unit 108 calculates a demagnetization control excitation current manipulation amount ΔId' according to Expression (2) shown below.

[Mathematical Formula 2]

$$\Delta Id' = KM \cdot \Delta Id \quad (2)$$

Here, KM represents the demagnetization control gain correction value, and

ΔId represents the change in the excitation current command value Id* with respect to time.

In this case, the demagnetization control excitation current manipulation amount ΔId' is a time-derivative value of the excitation current command value Id* shown in FIG. 5(a), and its waveform is as shown in FIG. 5(b). In the demagnetization control, ΔId' is negative, and Expression (3) shown below is satisfied.

[Mathematical Formula 3]

$$Id^* > Id^* + \Delta Id' \quad (3)$$

Next, the inverter control unit 108 performs a magnetic flux command calculation 108D that is a low-pass filtering process on Id*+ΔId' shown in FIG. 5(c), and outputs a d-axis magnetic flux command value Φ2d* indicating the low-pass filter value of Id*+ΔId'. Therefore, without demagnetization control, the period from time t1 to time t4 is required before the d-axis magnetic flux command value Φ2d* converges to zero, as shown in FIG. 5(d). In a case where demagnetization control is performed, on the other hand, the d-axis magnetic flux command value Φ2d* converges to zero within the period from time t1 to time t3. That is, demagnetization control is allowed, so that the time at which the d-axis magnetic flux command value Φ2d* to converge to zero is shortened from time t4 to time t3.

As described above, even in the states #1 through #3 in Table 1, the state #4 in Table 1 can be quickly created at any time by the demagnetization control described above, and connection switching is then performed. Thus, contact arcs can be avoided without fail. Further, as the time required for connection switching can be minimized, it is possible to improve the efficiency curve over a wide rotation range, while maintaining the performance required for a rotating machine drive system. That is, the efficiency of the rotating machine 103 can be increased both in the low-speed rotation zone and the high-speed rotation zone.

The connection switching sequence described above is summarized in a flowchart shown in FIG. 6. In FIG. 6, in the control device 105, the internal voltage estimating unit 109 estimates the line internal voltage Vac to be induced by the field magnetic flux of the rotating machine 103, using the rotary frequency calculated by the inverter control unit 108 on the basis of the phase current information 106A, and field magnetic flux information (S1). The inverter control unit 108 then determines whether the DC voltage Vdc is higher than the line internal voltage Vac, from the result of the estimation performed by the internal voltage estimating unit 109 (S2). If the DC voltage Vdc is determined not to be higher than the line internal voltage Vac in step S2 (NO), or if the DC voltage Vdc is determined to be lower than the line internal voltage Vac, the inverter control unit 108 performs demagnetization control (S3). The process then returns to step S1, and steps S1 and S2 are repeated.

If the DC voltage Vdc is determined to be higher than the line internal voltage Vac in step S2 (YES), the inverter control unit 108 performs control to stop the current supply from the inverter device 101 to the rotating machine 103 (S4), and outputs a connection switching command to the winding command unit 110. The winding switching command unit 110, which has received the connection switching command, outputs the connection switching command to the winding switching device 120 (S5). As a result, the winding switching device 120 performs connection switching on the windings of the rotating machine 103.

After that, the inverter control unit 108 performs control to restart the current supply from the inverter device 101 to the rotating machine 103 (control to cause the IGBTs to perform switching operations) (S6), and the process in this routine comes to an end.

Meanwhile, when the current supply from the inverter main circuit 141 to the rotating machine 103 is stopped as connection switching is performed on the windings of the rotating machine 103, the torque of the rotating machine 103 becomes zero. Therefore, the rotating machine 103 is rotated only by the inertia of the rotating machine drive system. Also, in a case where the current supply from the inverter main circuit 141 to the rotating machine 103 is restarted after connection switching, the torque of the rotating machine 103 is raised from zero. Therefore, it takes time for the rotating machine 103 to reach the desired acceleration performance and satisfy the rotating conditions. In the case of a rotating machine drive system mounted on a vehicle, there is a problem that the ride comfort is degraded by the existence of such a period.

Therefore, this embodiment provides a method by which the demagnetization level is controlled so that the line internal voltage Vac has such a magnitude that can be estimated by the internal voltage estimating unit 109 even after the demagnetization control described above is performed, and the field magnetic flux is allowed to remain. With this method, the inverter control unit 108 can easily calculate the current input phase on the basis of the remaining field magnetic flux even after connection switching is performed, and enables a smooth restart of the current supply from the inverter main circuit 141 to the rotating machine 103. Further, as the field magnetic flux remains, it is possible to minimize the rising time of the torque of the rotating machine 3 after the current supply is restarted.

The control described above is effective in preventing deceleration at a time of connection switching, particularly in a 1C1M system.

The control described above is also effective in a 1CnM (n=2, 3, 4, . . . ) configuration in which one inverter device and at least two rotating machines are driven in combination, because the same effects can be achieved in such a configuration.

Further, in a rotating machine drive system in which combinations of 1CnM (n=1, 2, 3, . . . ) are formed with at least two groups, the timing for connection switching is changed for each group, so that the deceleration influence at a time of connection switching can be further reduced.

In a rotating machine drive system in which a certain time is allowed for switching connections of windings, on the other hand, the demagnetization level may be controlled so that the line internal voltage Vac becomes too low to be estimated by the internal voltage estimating unit 109, after demagnetization control is performed. That is, the control device 105 controls the demagnetization level so that the line internal voltage Vac after demagnetization control becomes zero when viewed with a value estimated on the basis of the phase current information 106A. At this time point of time, the line internal voltage Vac after the control device 105 performs demagnetization control has such a magnitude as to be estimated as zero by the control device 105 on the basis of the phase current information 106A, and therefore, is substantially zero. This makes it possible to minimize the potential difference between the contact points (between the ends and the starts). Thus, the durability of the contact points can be further increased.

In this embodiment, the circuit constant of the rotating machine 103 changes with switching of connections among the windings of the rotating machine 103. Therefore, the inverter device 101 is made to record a plurality of control parameters indicating the respective winding connection states before and after connection switching. Programming is then performed so that at least one of the control parameters to be used in calculations at the internal voltage estimating unit 109 and the inverter control unit 108 is changed from a control parameter before connection switching to a control parameter after connection switching, during the period from the stop of the current supply from the inverter main circuit 141 to the rotating machine 103 till the next restart of the current supply. Thus, the torque of the rotating machine 103 can be raised smoothly after the restart of the current supply.

Note that, in a permanent magnet synchronous machine, a field magnetic flux is constantly generated by magnetization of the permanent magnet. For this reason, in the states #1 through #3 in Table 1, a current that cancels the magnetization of the permanent magnet is applied from the stator, and the demagnetization control described above is performed so that the state #4 in Table 1 can be created at any time. Connection switching is then performed, and thus, contact arcs can be avoided without fail. However, the energy required for demagnetization increases, which might lead to an increase in the torque shock accompanying the demagnetization control. In this regard, it is preferable to perform switching of winding connections with a rotating machine drive system including an induction machine.

Further, in the case of a synchronous reluctance rotating machine, the residual magnetization of the rotor core is the field magnetic flux source. In this case, demagnetization control can also be applied in the same manner as above, and connection switching is performed always in the state #4 in Table 1. Thus, contact arcs can be avoided without fail.

According to this embodiment, the rotation zone of a rotating machine can be changed without contact arc generation. As a result, in a rotating machine that is operated at a variable speed by an inverter device, efficiency can be increased in a rotation range including both a low-speed rotation zone and a high-speed rotation zone. In addition to the effects described above, the effects described below can also be achieved.

As it is possible to avoid contact arcs simply by controlling the internal voltage, any additional protection circuit is unnecessary, and costs are not increased.

As mechanical switches are used in place of semiconductor switching elements, new power loss is not caused in the switching device portion.

Second Embodiment

Referring now to FIG. 7, a second embodiment of the present invention is described. FIG. 7 is graphs for explaining connection switching timings in the second embodiment of the present invention.

As shown in FIG. 7($a$), at a time of a transition from the low-speed rotation zone to the high-speed rotation zone, connection switching is performed in a first voltage ratio region in which the terminal voltage (the motor terminal voltage) Vm of the rotating machine 103 satisfies the relationship shown below with respect to the maximum voltage Vmax that can be supplied from the inverter main circuit 141: 0.5<Vm/Vmax or 0.5=Vm/Vmax, and Vm/Vmax<1 or Vm/Vmax=1. The reason for this is that the rotating machine 103 normally operated at a variable speed is designed so that the efficiency is maximized at the number of rotations at which the terminal voltage Vm reaches the maximum voltage Vmax. On the other hand, in a region higher than 0.5 times the number of rotations (the terminal voltage is 0.5 Vmax), there is no great difference in efficiency before and after connection switching.

Likewise, as shown in FIG. 7($b$), at a time of a transition from the high-speed rotation zone to the low-speed rotation zone, connection switching is performed in a second voltage ratio region in which the terminal voltage (the motor terminal voltage) Vm of the rotating machine 103 satisfies the relationship shown below with respect to the maximum voltage Vmax that can be supplied from the inverter main circuit 141: 0<Vm/Vmax or 0=Vm/Vmax, and Vm/Vmax<0.5 or Vm/Vmax=0.5.

According to this embodiment, when the rotation zone of the rotating machine 103 changes from the low-speed rotation zone to the high-speed rotation zone, connection switching is performed in the first voltage ratio region. When the rotation zone of the rotating machine 103 changes from the high-speed rotation zone to the low-speed rotation zone, connection switching is performed in the second voltage ratio region. Thus, the efficiency of the rotating machine 103 before and after connection switching can be maximized.

Third Embodiment

Referring now to FIG. 8, a third embodiment of the present invention is described. FIG. 8 is a configuration diagram of a rotating machine drive system that is used in a railroad vehicle according to the third embodiment of the present invention.

Electric power from an overhead line 2 is supplied to the drive system of the railroad vehicle via a power collector 5, and AC power is supplied to rotating machines 103 through a power conversion device 1, to drive the rotating machines 103. The rotating machines 103 are connected to the axles 4 of the railroad vehicle, and running of the railroad vehicle is controlled by the rotating machines 103. The electrical ground is connected via rails 3. Here, the voltage of the overhead line 2 may be either a DC voltage or an AC voltage.

According to the above embodiment, the rotating machine drive system of one of the embodiments described so far is mounted on a railroad vehicle system. Thus, the rotating machine drive system of the railroad vehicle can be operated with high efficiency. The same effects as above can also be achieved in vehicles such as automobiles and construction machines.

It should be noted that the present invention is not limited to the embodiments described above, and includes various modifications. For example, the above embodiments have been described in detail for ease of understanding of the present invention, and the present invention is not limited to a structure that includes all the components described above. Further, some of the components of one embodiment can be replaced with some of the components of another embodiment, or a component of one embodiment can be added to the configuration of another embodiment. It is also possible to add a component to each embodiment, delete one of the components of each embodiment, or replace one of the components of each embodiment with some other component.

Further, some or all of the components, functions, and the like described above may be formed with hardware through designing by an integrated circuit or the like, for example. Alternatively, some or all of the above components, functions, and the like described above may be formed with software, as a processor interprets and executes programs for executing the respective functions. Information such as programs, tables, and files for executing the respective functions is stored in a memory, a recording device such as hard disk or a solid state drive (SSD), or a recording medium such as an integrated circuit (IC) card, a secure digital (SD) memory card, or a digital versatile disc (DVD).

REFERENCE SIGNS LIST 1 power conversion device
2 overhead line
3 rails
4 wheel
5 power collector
101 inverter device
102 DC power supply
103 rotating machine
104 inverter circuit
105 control device
106 phase current detecting circuit
108 inverter control unit
109 internal voltage estimating unit
110 winding switching command unit
120 winding switching device
141 inverter main circuit
142 gate driver
150 stator winding
151 neutral point

The invention claimed is:

1. A rotating machine drive system comprising:
a rotating machine that includes a plurality of windings;
a phase current detecting circuit that detects a phase current to be supplied to the rotating machine;
an inverter device that includes:
an inverter circuit that converts DC power from a DC power supply into AC power; and
a control device that controls power conversion being performed by the inverter circuit on a basis of the phase current detected by the phase current detecting circuit, the inverter device operating the rotating machine at a variable speed; and
a winding switching device that switches connections of the plurality of windings in accordance with a command from the control device, wherein
when a rotation zone of the rotating machine is to be changed, the control device stops a current supply from the inverter circuit to the rotating machine, and switches the rotation zone of the rotating machine from a low-speed rotation zone to a high-speed rotation zone, or from a high-speed rotation zone to a low-speed rotation zone, on condition that a line internal voltage induced by a field magnetic flux of the rotating machine is lower than a DC voltage of the DC power supply,
the control device controls a rotary frequency of the rotating machine, estimates the line internal voltage on a basis of the phase current detected by the phase current detecting circuit, and issues a command for switching connections of the plurality of windings to the winding switching device at the rotary frequency at which the estimated line internal voltage is lower than the DC voltage,
when the line internal voltage is higher than the DC voltage either before or after the connection switching before the current supply from the inverter circuit to the rotating machine is stopped, the control device reduces the field magnetic flux of the rotating machine by reducing an excitation current command value to perform demagnetization control to make the line internal voltage lower than the DC voltage both before and after the connection switching, and
the line internal voltage after the control device performs the demagnetization control is zero when viewed from a value estimated by the control device on a basis of the phase current.

2. The rotating machine drive system according to claim 1, wherein, while the line internal voltage after the demagnetization control is performed is maintained at a magnitude to be estimated on a basis of the phase current detected by the phase current detecting circuit, and after the connection switching is performed, the control device restarts the current supply from the inverter main circuit to the rotating machine on a basis of phase information obtained from the phase current detected by the phase current detecting circuit.

3. The rotating machine drive system according to claim 2, wherein
the control device has a plurality of control parameters indicating respective winding connection states before and after the connection switching, and
during a period from the stop of the current supply till the restart of the current supply, the control device changes at least one of the plurality of control parameters from the control parameter before the connection switching to the control parameter after the connection switching.

4. The rotating machine drive system according to claim 1, wherein, when the rotation zone of the rotating machine is changed from the low-speed rotation zone to the high-speed rotation zone, the control device performs the connection switching in a voltage ratio region in which a terminal voltage Vm of the rotating machine satisfies a relationship with respect to a maximum voltage Vmax to be supplied from the inverter device, the relationship being such that 0.5<Vm/Vmax or 0.5=Vm/Vmax, and Vm/Vmax <1 or Vm/Vmax=1.

5. The rotating machine drive system according to claim 1, wherein, when the rotation zone of the rotating machine is changed from the high-speed rotation zone to the low-speed rotation zone, the control device performs the connection switching in a voltage ratio region in which a terminal voltage Vm of the rotating machine satisfies a relationship with respect to a maximum voltage Vmax to be supplied from the inverter device, the relationship being such that 0<Vm/Vmax or 0=Vm/Vmax, and Vm/Vmax <0.5 or Vm/Vmax=0.5.

6. The rotating machine drive system according to claim 1, wherein the winding switching device is formed with a mechanical switch.

7. The rotating machine drive system according to claim 1, wherein the rotating machine is an induction machine.

8. The rotating machine drive system according to claim 1, wherein the rotating machine drive system has a 1C1M configuration in which the inverter devices and the rotating machines are driven in combination.

9. The rotating machine drive system according to claim 8, further comprising additional rotating machines and additional inverter devices wherein combinations in the 1CnM (n=1, 2, 3, . . . ) configuration are formed with at least two groups.

10. The rotating machine drive system according to claim 1, wherein the rotating machine drive system has a 1CnM (n=2, 3, 4, . . . ) configuration in which one of the inverter devices and at least two of the rotating machines are driven in combination.

11. A vehicle on which a rotating machine drive system that drives a rotating machine is mounted, the vehicle comprising the rotating machine drive system according to claim 1 as the rotating machine drive system.

* * * * *